UNITED STATES PATENT OFFICE.

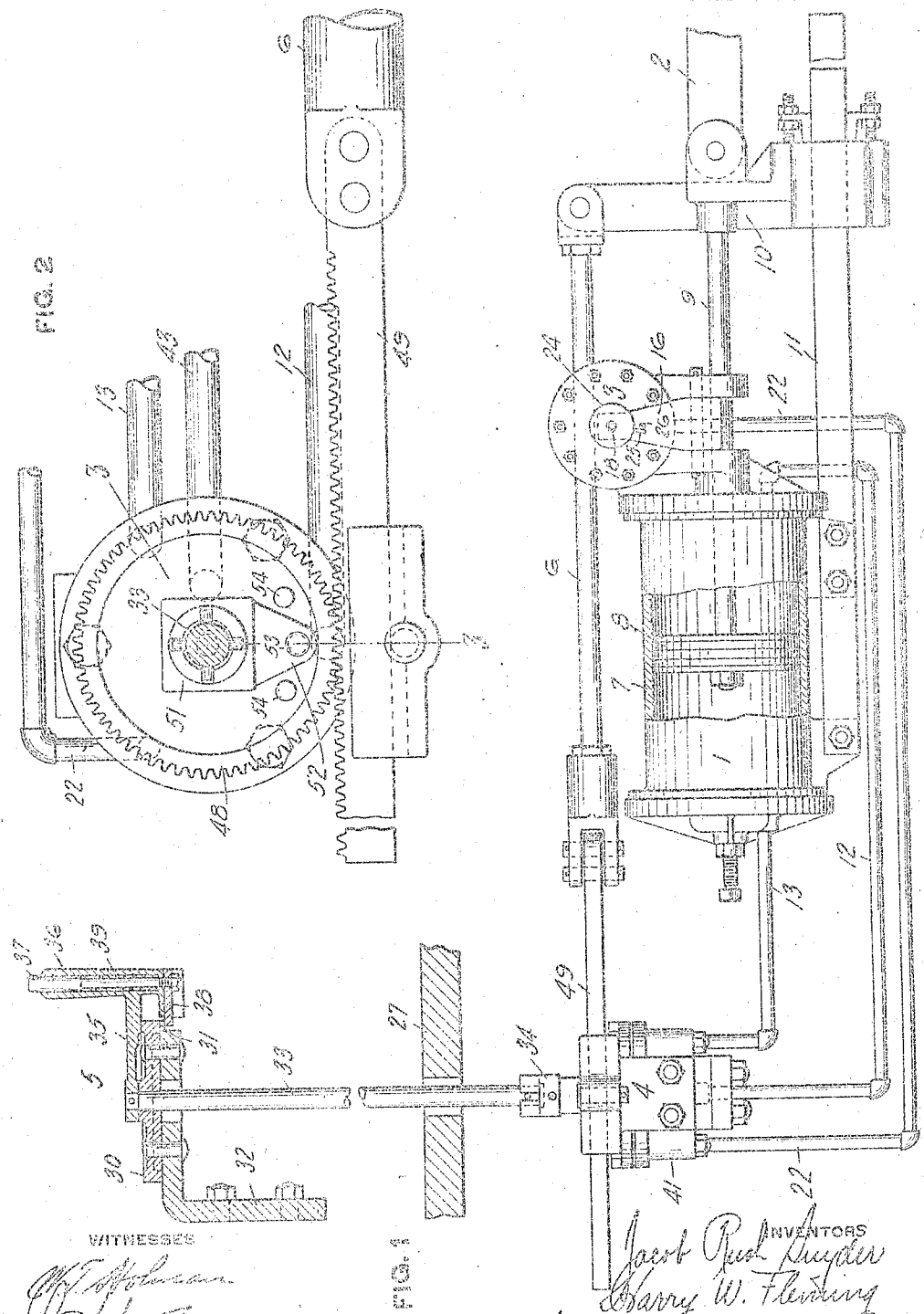

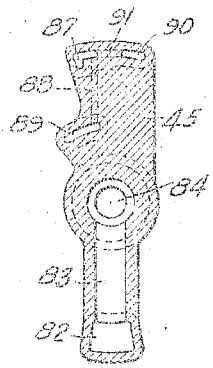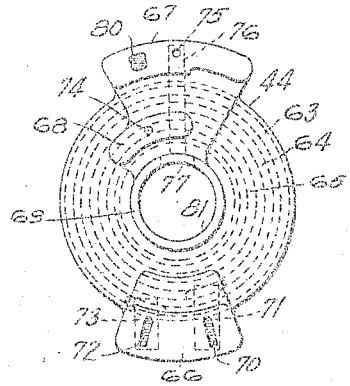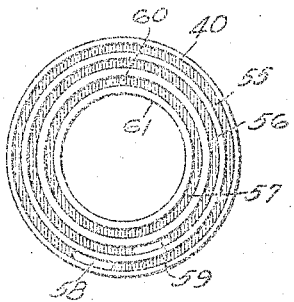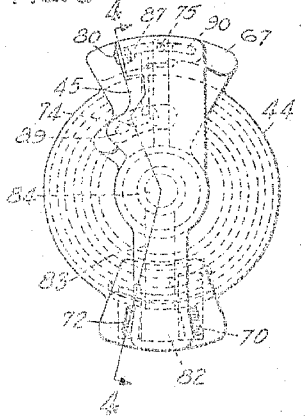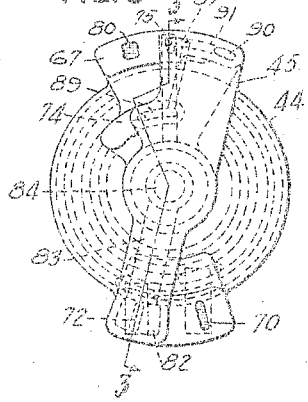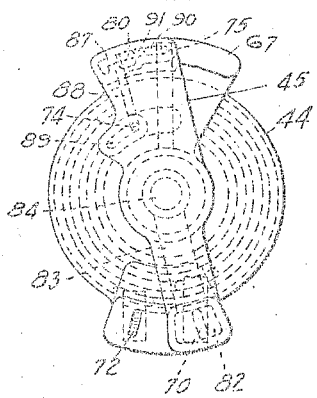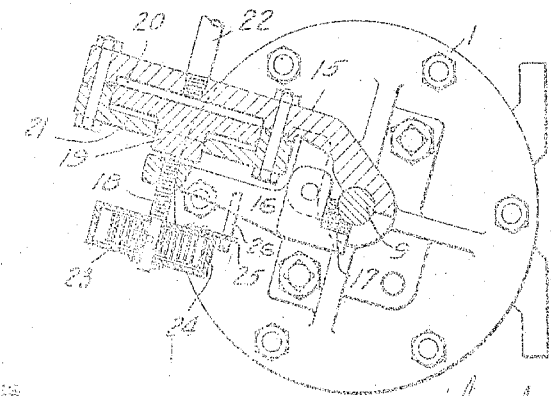

JACOB RUSH SNYDER AND HARRY W. FLEMING, OF PITTSBURGH, PENNSYLVANIA, ASSIGNORS TO PERCY E. DONNER, OF PITTSBURGH, PENNSYLVANIA.

POWER-REVERSE GEAR.

1,303,979.  Specification of Letters Patent.  Patented May 20, 1919.

Application filed March 26, 1917. Serial No. 157,423.

*To all whom it may concern:*

Be it known that we, JACOB RUSH SNYDER and HARRY W. FLEMING, citizens of the United States, and residents of Pittsburgh, in the county of Allegheny and State of Pennsylvania, have invented a new and useful Improvement in Power-Reverse Gears, of which the following is a specification.

The invention relates to power reverse gears, and particularly to power mechanism for reversing and controlling the valve mechanism of locomotives.

One object of the invention is to provide an improved power reverse gear which may be easily controlled, is positive in its action, and when in stationary position is not only positively locked but arranged so that there is no force tending to move it from such position until movement is desired and the controlling mechanism actuated by the operator.

A further object is to provide a reverse gear which may be readily located on a locomotive with a controlling device of minimum size in the locomotive cab, thereby avoiding unnecessary mechanism in the limited space of the cab.

Still a further object is to provide a reverse gear having a friction lock, which type has been found to be the most efficient and desirable, so constructed as to automatically adjust itself to compensate for wear in service.

Other objects and advantages will appear from the following specification.

An embodiment of the invention is shown in the accompanying drawings, the views of which are as follows:

Figure 1 is a side elevation and partial cross section of the power reverse gear as it is applied to a locomotive.

Fig. 2 is a plan view, showing in detail the mechanical connections between the reversing rod and the valve mechanism.

Fig. 5 is a cross section of the graduating rotary element of the valve.

Fig. 6 is a plan of the main rotary element of the valve.

Fig. 7 is a plan view of the valve seat.

Fig. 8 is a plan view of the valve seat, main rotary and graduating rotary, showing their relative relation when the valve is in neutral position.

Fig. 9 is a view corresponding to Fig. 8, with the main rotary moved to actuate the reverse gear in one direction.

Fig. 10 is a view similar to Fig. 9 with the main rotary moved to operate the reverse gear in the opposite direction, and Fig. 11 is a cross section of the lock, showing the automatic compensating means therefor.

Figure 3:
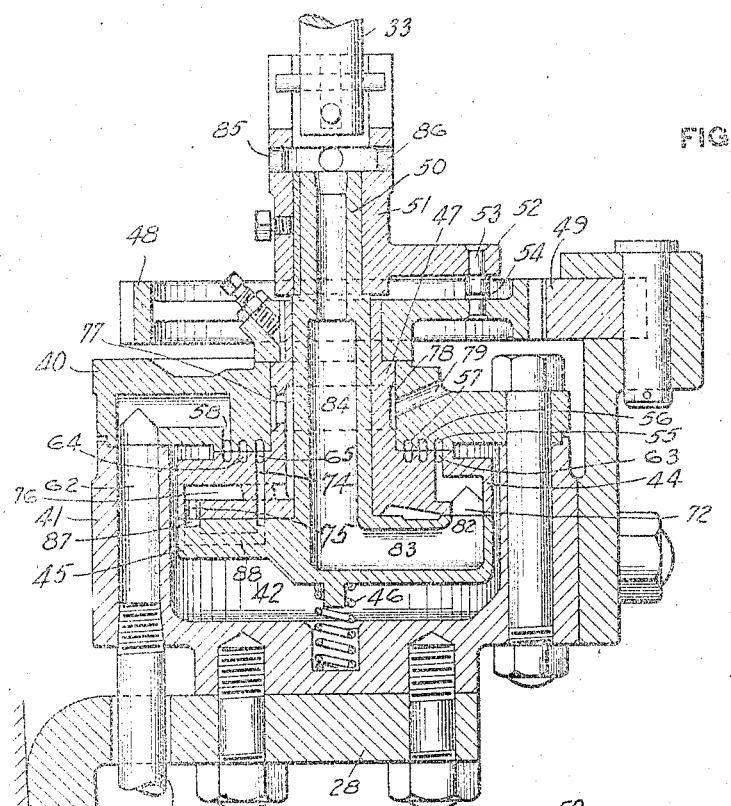
Fig. 3 is a cross section of the valvular mechanism for controlling the motive fluid to the fluid pressure motor and the lock. This section is on the line 3—3 of Fig. 2 with the valve members in the position shown in Fig. 9, and the section through them on the line 3—3 of Fig. 9.
Figure 4:
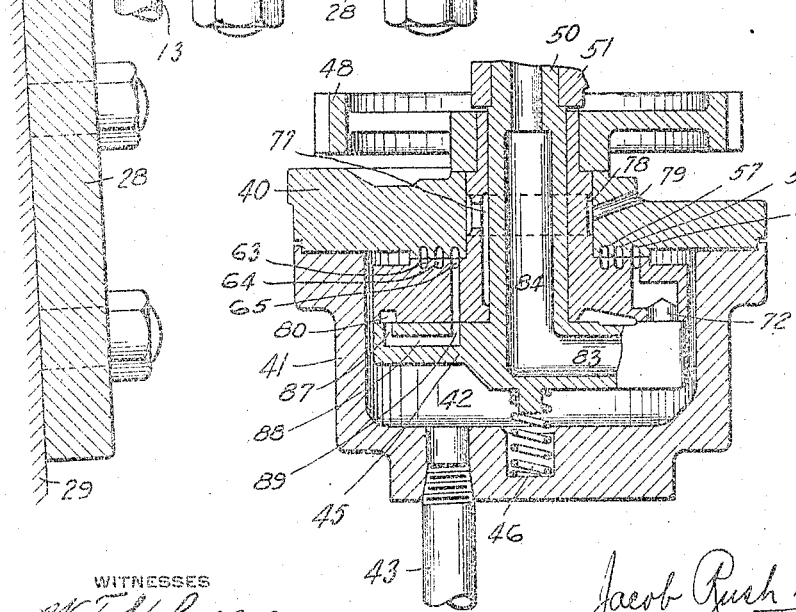
Fig. 4 is a cross section of a portion of the valvular mechanism, showing the valve members in the position illustrated in Fig. 8, the section being taken on the line 4—4 of Fig. 8.

The reversing gear includes in its general structure a fluid pressure motor 1, operating a reversing rod 2, a fluid pressure lock 3, a valvular mechanism 4 for controlling the motive fluid to and from the motor and the lock, a manual controlling means 5 for operating the valvular mechanism, and connections comprising in this instance a rod 6 and associated parts for connecting the reversing rod and the valvular mechanism so as to automatically return the mechanism to neutral position after the rod has moved the required extent.

The fluid pressure motor comprises a power cylinder 7 in which operates a piston 8 connected to a piston rod 9 attached to the cross head 10 to which the reversing rod 2 is fastened. The cross head 10 slides on a bar 11 which may be attached to the cylinder or otherwise suitably supported. The motor is actuated to move the reversing rod to the right, viewed in Fig. 1, by exhausting fluid pressure from the right-hand end of the cylinder through the pipe 12, thereby permitting the fluid pressure in the left-hand end of the cylinder, which pressure is maintained by being connected with the fluid pressure supply through the pipe 13, to move the piston to the right. The motor operates in the reverse direction by exhausting fluid pressure through the pipe 13 so as to permit the pressure in the right-hand end of the cylinder to move the piston to the left.

The fluid pressure lock 3 is preferably located adjacent the power cylinder and arranged to grip the piston rod 9. In this instance a portion of the lock is formed integral with the cylinder and this portion comprises a member 15 formed integral with the cylinder 7 and arranged to engage one side of the piston rod 9. The lock also has a movable element comprising a pivoted lever 16, one end of which carries a friction grip or braking surface 17 made of asbestos composition or the like, and the other end of which carries a set screw 18 engaged by a movable abutment 19 arranged to be actuated by fluid pressure in the chamber 20 formed between the stationary member 15 of the lock and a complementary member 21. Fluid pressure is supplied to the lock through a pipe 22 connected to the valvular mechanism 3 which also controls the motive fluid to the power cylinder. When pressure is admitted through the pipe 22 to the chamber 20, the abutment 19 is forced against the set screw 18 in the outer end of the pivoted lever 16, thereby forcing the gripping surface 17 into tight engagement with the rod to frictionally lock the rod in position. This lock has the advantage that it firmly grips and holds the rod in whatever position it may occupy without requiring that teeth or notches in one part register with notches or teeth in another part. It also grips the rod in such a manner that no binding action occurs to prevent operation of the lock and under abnormal strains the piston rod may be moved without breaking any part of the mechanism.

The force with which the lock is applied may be adjusted by varying the position of the set screw 18 in the outer end of member 16. Such set screw should be adjusted when the reversing gear is put into operation so as to cause the lock to work properly, but very frequently this adjustment is carelessly made and moreover after the reversing gear is operated for a considerable period, the friction surface 17 may wear so as to require re-adjustment of the lock. Such re-adjustment may be overlooked in inspection of the mechanism and in order to avoid any difficulties arising from improper setting or from wear in service, means has been provided for automatically adjusting the set screw 18 to proper position. This means comprises a spring 23 attached at one end to the set screw 18 and at its other end to a casing 24 which houses the spring and carries a projection 25 engaging a pin 26 carried by the lever 16. This spring has sufficient tension to turn the set screw to cause it to engage the abutment 19 and as the surface 17 wears, to continually keep the set screw in engagement with the abutment. The spring thus automatically adjusts the lock when the mechanism is first applied and thereafter compensates for any wear that may occur in service. The result is that the lock requires no attention.

The power cylinder, its operative parts including the cross head and reversing rods and the fluid pressure lock, constitutes a unit which may be readily positioned on a locomotive either on the side of the boiler, beneath the cab or, in large locomotives, farther forward and closer to the valve links. The valvular mechanism 4 for the reverse gear is located on the side of the fire box beneath the cab, the deck of which is shown at 27 in Fig. 1. This valve may be supported by a bracket 28 attached to the side of the fire box 29, as illustrated in Fig. 3. It is, of course, to be understood that the valve and the power cylinder may be supported in any suitable manner, but the valve is located beneath the cab where it is out of the way and preferably the power cylinder is also located beneath the cab so that the connections between the reversing rod and the valve and between the power cylinder and the valve may be easily made. In such case, the reversing rod extends forward to the valves of the locomotive. Where it is necessary to locate the power cylinder farther forward, the reversing rod is, of course, shorter and the connections between the power cylinder and the valve longer.

The manual controlling means 5 for operating the valvular mechanism 4 is very simple and occupies a minimum amount of space in the cab. It comprises a disk 30 having a plurality of teeth 31 on its lower side and near its outer edge. This disk may be supported in any suitable way, as for example, by means of a bracket 32 attached to the side of the fire box. A connecting rod 33 is journaled in the disk and connected at its lower end by means of a pin and slot or other suitable connection 34 to the valve and at its upper end to a lever 35 having a handle 36 in which is positioned a reciprocating thumb latch 37 having a dog 38 normally biased into engagement with the teeth in the disk 30 by means of a spring 39. The valve 4 is controlled by simply operating the thumb latch and rotating the handle in either a forward or a reverse direction and to an extent corresponding to the desired movement of the reverse gear. The construction is simple and it provides a maximum number of positions for the controlling handle without requiring a large space in which to move such handle.

The valvular mechanism 4 includes a valve seat 40 forming the top portion or cap for a valve casing 41 inclosing a chamber 42 which is normally in connection with the motive fluid supply through a pipe 43 shown in Fig. 2. Rotating on this valve seat and located in the chamber 42 is a main rotary member 44 and rotating on the main rotary is a graduating rotary 45. The main rotary is maintained in engagement with the valve seat and the graduating rotary is maintained in engagement with the main rotary by the fluid pressure which is present at all times in the chamber 42 in the valve casing. In addition, these members are biased into engagement with each other by a spring 46 which engages the bottom of the valve casing and the graduating rotary 45. The main rotary has a hollow hub 47 extending through the valve seat and connected to a gear 48 that meshes with a rack 49 connected to the reach rod 6 that is attached to the cross head 10. The main rotary thus moves in synchronism with the reversing rod. The graduating rotary has a hollow hub or stem 50 extending through the hub of the main rotary and connected to a sleeve 51 which is rotated by the connecting rod 33 from the manual operating means 5. The graduating rotary is thus directly under the control of the operator and may be actuated by him for operating the reverse gear. The sleeve 51 has an extension 52 carrying a pin 53 arranged to engage projections 54 in the form of pins so as to limit the movement of the graduating rotary relative to the main rotary. There are two of these pins so as to limit the movement in both directions, as shown in Fig. 2.

The valve seat 40 has three concentric grooves or recesses 55, 56 and 57, and three ports 58, 59 and 60 and a through passage 61 in which is positioned the hub of the main rotary. The port 58 communicates with the groove 55 in the valve seat and with a passage 62 in the valve casing to which is connected the pipe 13 leading to the left-hand end of the power cylinder. The port 59 communicates with the groove 56 in the valve seat and has connected thereto the pipe 12 leading to the right-hand end of the cylinder. The port 60 communicates with the recess 57 in the valve seat and has connected thereto the pipe 22 leading to the lock.

The main rotary has three concentric grooves or recesses 63, 64 and 65 complemental to the grooves in the valve seat. These grooves are shown in dotted lines in Fig. 6 and are on the bottom face of the rotary as there illustrated. The bottom face of the rotary, as shown in Fig. 6, operates on the top face of the valve seat, as shown in Fig. 7, with the concentric recesses in registry so that annular concentric passages are formed by the valve seat and rotary. By means of this construction the two members may be moved relative to one another to any extent without changing the fluid pressure connections to any of the ports opening into the annular recesses, for a purpose which will be more clear hereinafter.

The main rotary has in addition to the main circular body portion containing the recesses 63, 64 and 65, three segmental raised faces 66, 67, 68 and an annular hub face 69, said segmental faces containing four ports, a cavity and a number of coöperating passages, as follows:

A port 70 communicating with a horizontal passage 71 which opens into the concentric recess 64 that registers with the recess 56 in the valve seat having the port 59 therein leading to the right-hand end of the cylinder; a port 72 communicating with a passage 73 which opens into the annular recess 63 that registers with the corresponding recess 55 in the valve seat which has the port 58 leading to the left-hand end of the cylinder; a through port 74 communicating with the annular recess 65 which registers with the corresponding recess 57 in the valve seat having the lock port 60 therein; an exhaust port 75 communicating through the passage 76 with a vertical recess 77 in the hub of the rotary that in turn communicates with an annular recess 78 on the outer periphery of the hub where it fits within the valve seat, as shown in Fig. 3, and which annular recess is in communication with the exhaust port 79. The main rotary also has a recess or cavity 80 in the top face of the segment 67 for a purpose hereinafter described and it has a central opening 81 to accommodate the hub or stem of the graduating rotary.

The graduating rotary is shown in Fig. 5 and comprises a substantially rectangular member arranged to be rotated about a central axis. It has faces for engaging the faces 66, 67, 68 and 69 of the main rotary, and ports and passages coöperating with the main rotary, as follows: An exhaust port 82 adapted to register with either of the ports 70 or 72 leading to the two ends of the power cylinder, and communicating with a passage 83 opening into the passage 84 through the hollow stem of the graduating rotary which passage communicates with the atmosphere through the openings 85 and 86, shown in Fig. 3; a recess 87 communicating by a passage 88 with a recess 89 which is adapted to register with the lock port 74 of the main rotary, and a recess 90 communicating by a passage 91 with the recess 87. The passage 91 does not open to either side of the valve member, but simply connects recesses 87 and 90.

The main rotary works on top of the valve seat and the graduating rotary on top of the main rotary, as hereinbefore explained and as shown in Fig. 3, there being fluid pressure on top of both rotaries tending to hold them in position and furnishing motive fluid through any port that may be exposed in the valve cavity 42. The valvular mechanism has three positions, as follows:

1. Neutral position.

This position is shown in Fig. 8. The narrow portion of the graduating rotary containing the exhaust port 82 is positioned between the two ports 70 and 72 of the main rotary so that these ports are exposed in the valve chamber and motive fluid flows through them to both ends of the cylinder. Both ends of the cylinder are thus in communication with each other and with the motive fluid supply. The exhaust recess 82 in the graduating rotary is blanked by the blank surface of the face 66 so that there is no communication to exhaust through said port. One edge of the recess 80 in the main rotary is exposed, thereby permitting motive fluid to flow through said recess under the graduating rotary and up through recess 87 and through passage 88, recess 89 and port 74 to the annular recess 57 in the valve seat and thence to the lock. Motive fluid is thus also supplied to the lock to keep the lock applied. The exhaust port 75 is blanked by the face of the graduating rotary.

2. Operative position.

This position which is the position for operating the motor in one direction is shown in Fig. 9. The graduating rotary has been moved in a clockwise direction from the position shown in Fig. 9, thereby connecting the port 72 with the recess 82 leading to the exhaust and accordingly exhausting one end of the cylinder. The port 70 remains in communication with the valve chamber 42 and motive fluid continues to be supplied to the other end of the cylinder. The interlocking connection between the means for actuating the main rotary and the graduating rotary, namely, the coöperating pins 53 and 54, prevent the graduating rotary being moved beyond a certain position relative to the main rotary, such as shown in Fig. 9. The lock port 74 in the main rotary continues to be in communication with the recess 89 in the graduating rotary and communicates therethrough and through the passage 88 with the recess 87 which now registers with the exhaust port 75. Consequently, in this position of the valve members, the lock is exhausted. In the movement of the graduating rotary from neutral position, such as shown in Fig. 8, to the operative position of Fig. 9, the ports and recesses are timed so that the recess 87 communicates with the exhaust port 75 slightly before the port 72 is connected to exhaust so as to unlock the lock just an instant before one side of the power cylinder is exhausted.

3. Operative position, reverse direction.

This position corresponds in functional operation to that shown in Fig. 9, except that the motor is actuated in the reverse direction. The port 70 communicates with the exhaust recess 82 and the port 72 to the other end of the cylinder remains in communication with the fluid pressure in the valve housing. The lock port 74 continues in communication with the recess 89 and through the passages 88 and 91 and recesses 90 to the exhaust port 75.

The general operation of the reverse gear is as follows:

With the reverse gear at rest, the valve members occupy the neutral position shown in Fig. 8 and both ends of the motor are in communication with each other and with the motive fluid supply, and motive fluid is also supplied to the lock. The reversing rod is thus not only firmly locked in position by the fluid pressure applied friction lock, but by reason of the fact that both sides of the cylinder are in communication with each other, any leaks in the system affect both sides of the motor equally so that there can be no force tending to move the gear. The handle for controlling the valve is latched in position and consequently the entire mechanism is firmly and rigidly held in position and rendered inert and proof against undesired movement.

When it is desired to actuate the reverse gear, the operator grasps the handle 36, presses the thumb latch 37 and moves the handle in either direction, depending upon which direction it is desired to move the reverse gear. The handle may be freely moved until the pin 53 engages the pin 54. During this movement the valvular mechanism is actuated to exhaust motive fluid from the lock to unlock the reverse gear and immediately disconnect one side of the motor from the other and from the motive fluid supply and exhaust it so that the reverse gear starts to move in a direction corresponding to the direction of movement of the handle. Movement of the reverse gear is transmitted through the rod to the gear 48 carrying the pin 54 and consequently the gear 48 carrying pin 54 moves in the same direction as the handle. All these operations take place instantaneously, thereby permitting the handle to be moved in the desired direction by a substantially continuous movement.

The interlocking connections between the graduating rotary which is controlled by hand and the main rotary which operates in synchronism with the reverse gear serve two useful functions, first, over-travel of the graduating rotary relative to the main rotary is prevented, and second, in case the operator is unable to move the handle farther than a limited distance, he is immediately notified that something is wrong with the reverse gear.

After the gear has been set into operation as above described, it continues to move, until the main rotary is returned to its original position relative to the graduating rotary, whereupon the end of the cylinder which has been exhausted is again connected to the motive fluid supply and with the other end of the cylinder and fluid pressure is admitted to the lock. The gear is thus automatically stopped and locked in position.

In addition to the advantages in the operation of the reverse gear and of the lock as hereinbefore pointed out, the gear is constructed so that it may be readily applied to a locomotive and operated from the cab, but no bulky mechanism need be located in the cab. The power cylinder, lock and reversing rod constitute a unit which may be located either under the cab or forwardly on the engine; the valvular mechanism constitutes a second unit which is preferably located beneath the cab and the controlling means constitutes a third unit of small size which can be located in the cab for controlling the gear.

It is to be understood that the structure shown is for purposes of illustration only and that other structures may be devised which come within the spirit and scope of the appended claims.

What is claimed is:

1. A power reverse gear, comprising a fluid pressure motor, a reversing rod operated thereby, a fluid pressure applied lock for locking said rod, a rotary valvular mechanism for controlling the motive fluid to and from said motor and said lock, said mechanism being arranged in neutral position to maintain both sides of the motor in communication with each other and with the motive fluid supply and to admit motive fluid to the lock, and, when actuated, to exhaust motive fluid from the lock and disconnect one side of the motor from the other and from the motive fluid supply and exhaust it, and connections including a rack bar engaging a gear connected to the rotary valvular mechanism for automatically returning the valvular mechanism to neutral position after the reversing rod has moved the required extent.

2. A power reverse gear for locomotives, comprising a power cylinder, a reversing rod operated thereby, a fluid pressure lock for locking said rod, valvular mechanism for controlling the motive fluid to and from the cylinder and the lock, said valvular mechanism being located substantially in line with the power cylinder, a member mechanically connected to the reversing rod and having a straight reciprocating movement therewith and operatively connected to the valvular mechanism for automatically returning the latter to neutral position after the rod has moved the required extent, and manually operable means for actuating the valvular mechanism.

3. A power reverse gear for locomotives, comprising a power cylinder, a reversing rod operated thereby, a fluid pressure lock for locking said rod, a rotary valvular mechanism for controlling the motive fluid to and from the cylinder and the lock, said valvular mechanism being located substantially in line with the power cylinder, a member mechanically connected to reciprocate in a straight line with the reversing rod and operatively connected to the rotary valvular mechanism for automatically returning the latter to neutral position after the rod has moved the required extent, and manually operable means for actuating the valvular mechanism.

4. A power reverse gear for locomotives, comprising a power cylinder, a reversing rod operated thereby, a fluid pressure lock for locking said rod, said elements constituting a unit arranged to be mounted on a locomotive to operate the valve links thereof, valvular mechanism for controlling the motive fluid to and from the cylinder and the lock, said valvular mechanism being located substantially in line with the power cylinder, a member mechanically connected to reciprocate in a straight line with the reversing rod and operatively connected to the valvular mechanism for automatically returning the latter to neutral position after the rod has moved the required extent, said valvular mechanism and the connections being arranged to be located outside of the locomotive cab, and manually operable means arranged to be located in the locomotive cab for actuating the valvular mechanism.

5. A power reverse gear, comprising a fluid pressure motor, a reversing rod operated thereby, a fluid pressure friction lock for locking said rod, means for automatically adjusting the said lock to maintain its gripping action uniformly, and valvular mechanism for controlling the flow of motive fluid to and from said motor and lock.

6. A power reverse gear, comprising a fluid pressure motor, a reversing rod operated thereby, a fluid pressure applied friction lock for locking said rod, means for automatically adjusting said lock to compensate for wear, and valvular mechanism for controlling the motive fluid to and from said motor and lock.

7. A power reverse gear, comprising a fluid pressure motor, a reversing rod operated thereby, a fluid pressure applied friction lock comprising a clamping lever normally biased by a movable abutment into engagement with the reversing rod, means for automatically adjusting the contact between the movable abutment and the lever for regulating the grip of said lever on the rod to compensate for wear, and valvular mechanism for controlling the motive fluid to and from said motor and lock.

8. A power reverse gear, comprising a fluid pressure motor, a reversing rod operated thereby, a fluid pressure applied friction lock comprising a movable abutment engaging a set screw on a pivoted lever to bias the lever into engagement with the reversing rod, means comprising a spring normally biasing the set screw into engagement with the abutment to adjust the friction grip of the lever to compensate for wear, and valvular mechanism for controlling the motive fluid to and from the cylinder and the lock.

In testimony whereof, we have hereunto set our hands.

JACOB RUSH SNYDER.
HARRY W. FLEMING.

Witnesses:
L. C. SHANTZ,
W. T. HOLMAN.